United States Patent [19]

Dean

[11] Patent Number: 5,569,811
[45] Date of Patent: Oct. 29, 1996

[54] METHOD FOR ISOLATING, IMMOBILIZING AND RENDERING WASTE NON-LEACHABLE

[76] Inventor: Miles W. Dean, P.O. Box 201341, Anchorage, Ak. 99520

[21] Appl. No.: 319,169

[22] Filed: Oct. 6, 1994

[51] Int. Cl.⁶ .............................. A62D 3/00; B09B 3/00; G21F 9/34
[52] U.S. Cl. ........................... 588/252; 588/16; 588/259; 405/129
[58] Field of Search .................... 588/1, 16, 17, 588/249, 250, 252, 259; 405/128, 129

[56] References Cited

U.S. PATENT DOCUMENTS

| | | | |
|---|---|---|---|
| 3,658,179 | 4/1972 | Baumann et al. | 588/16 X |
| 3,980,558 | 9/1976 | Thompson . | |
| 4,317,684 | 3/1982 | Hooykaas | 588/252 X |
| 4,400,313 | 8/1983 | Roberson et al. | 588/252 X |
| 4,738,564 | 4/1988 | Bottillo | 405/128 |
| 4,892,684 | 1/1990 | Harp | 588/16 X |
| 5,055,196 | 10/1991 | Darien et al. | 210/638 |
| 5,115,986 | 5/1992 | Bateson et al. | 241/20 |
| 5,350,569 | 9/1994 | Coppa | 588/16 X |
| 5,360,632 | 11/1994 | Johnson et al. | 588/249 X |
| 5,405,225 | 4/1995 | Bilkenroth et al. | 405/129 |
| 5,416,249 | 5/1995 | Crayne et al. | 588/259 X |
| 5,416,251 | 5/1995 | Lomasney et al. | 405/128 X |
| 5,476,993 | 12/1995 | Richmond | 588/252 |

*Primary Examiner*—George A. Suchfield
*Attorney, Agent, or Firm*—Jenkens & Gilchrist

[57] ABSTRACT

A process for treating a contaminated solid unacceptable for disposal in the environment is described whereby the contaminated solid is contacted in a bath of a molten paraffinic hydrocarbon for time sufficient to expel moisture and to coat the solid rendering the contaminant immobile, isolated and unleachable into the environmental system once the paraffin has solidified. An embodiment of this invention employs a zeolite to absorb liquid wastes expelled from the solid.

48 Claims, No Drawings

METHOD FOR ISOLATING, IMMOBILIZING AND RENDERING WASTE NON-LEACHABLE

BACKGROUND

1. Field of the Invention

This invention relates to a method for encapsulating waste and for permanently rendering the waste non-leachable and to allow permanent disposal in an environmentally safe manner.

2. Brief Description of the Prior Art

For centuries waste and refuse, both benign and dangerous, have been disposed of directly into landfills without significant concern about the environment. Even when treated prior to disposal, such as by encapsulation in either glass or cement, leaching of hazardous materials into the earth and ground water has occurred. The Kidron Valley of Biblical times has to be the most famous and probably the largest landfill in the world in use for thousands of years to receive all kinds of waste. Soils, meaning gravel, clay, sand, silt and gangues containment with all kinds of organic and inorganic materials have frequently been left as created, contaminated at the scene of the crime. Today, fortunately, efforts and methods are being explored to remove the contaminates from the ground or at least to prevent the escape of them through leaching by water. Some attempts include cleaning the soil or other waste with chemicals, encapsulating the waste in glass or in cement, or incinerating the waste or contaminated refuse. However, each of these methods are problematic. A method for cement encapsulation is taught in U.S. Pat. No. 3,980,558, for example. There are many others. The methods for treating contaminated soils are expensive because chemicals and significant labor must be utilized to clean the contaminated soil or waste, and there still is a residue to deal with. Moreover, the "throughput" of such processes is relatively low. For example, U.S. Pat. No. 5,055,196, issued to Darian, et al., teaches a process for treating soil and sludge for removal of contaminates in contact with the soil or sludge. In particular, metal or metal salts or organic contaminates such as PCBs are removed from water-wet soil and sludge by contacting the contaminated water-wet mixture with a solvent containing a comminuting surfactant. The difficult problems associated with disposal of that single waste, PCB contaminated wet soil, discussed in the '196 patent is ample evidence of the gargantuan effort required to address the environmental issues related to isolation, disposal and immobilization—making sure it stays put—of contaminated solids.

As another example, U.S. Pat. No. 5,115,986, issued to Bateson, et al., discloses a flotation process for purifying soil contaminated with organic materials in a specially adapted device which is used to "scrub" the contaminated soil. This invention has several drawbacks, one being that it discharges highly contaminated froth which must then be treated or recycled, trading one environmental problem for another. Moreover, the process is relatively slow and has a relatively low throughput. Finally, it is not clear that this process sufficiently cleans hazardous waste sufficiently to allow for the disposal of the waste in the ground without fear of leaching of contamination.

The other methods of treating waste for permanent storage represent a multitude of specialized problems. Encapsulating waste in glass or cement is expensive because of low throughput rates, as well as the logistic problems resulting from the weight of the finished product. Encapsulating in cement is especially problematic in that cement is porous and susceptible to leaching. Moreover, cement may disintegrate over time thereby allowing the waste to become mobile. Thus, a leachable waste normally is not effectively encapsulated in cement because of its porous nature as well as because of its potential for disintegration over time. Thus, there is no single process capable of treating many different types of waste. As an alternative to treating waste, incinerating contaminated refuse or waste does not yield ideal results. Incineration not only creates air pollution, but also consumes significant amounts of energy. Because of these drawbacks, waste, refuse, radioactive materials and contaminated soils (hereinafter, collectively referred to as "waste"), have traditionally been treated only when the hazardous nature of the waste, or when the effect of the environmental pollution, justified the high cost.

Wastes requiring safe disposal occur in many different forms, most readily recognizable as solid, liquid or gaseous wastes and mixtures. Often solids are contaminated with volatile liquids which, in some part, may be treated as the soils were treated described in the patents referred to above. Often the solid itself may become a waste by virtue of having received radiation from a source created by man or the waste itself, such as from power plant rods or the debris created in the manufacture of devices which involve radiation. There are also naturally occurring radioactive materials which naturally emit radiation. Of course, once a material becomes radioactive, there is no way of effectively removing the radioactivity and, therefore, the material itself must be disposed of safely, with assurance that the waste will not migrate to some other location. Current requirements for the disposal of radioactive wastes require assurances that the disposal is secure for thousands of years. The criminal penalties for violating such regulations are extremely severe.

In recent years, even practicing what had been considered prudent disposal practices, it has been discovered that many landfills containing hazardous waste can, and frequently do, contaminate water tables and water supplies through a leaching phenomena. Many varied attempts have been made, from landfill design and monitoring systems to elaborate and expensive treatment procedures, but with only limited success. Often there is an exchange of one environmental problem for one or more other problems. The need continues and thus the present invention, involving a method of encapsulating hazardous, including nuclear, waste or refuse, contaminated soils and solids which is inexpensive, which permanently prevents mobility of waste into the soils, aquifer and water supplies has resulted.

While the effort is a mammoth undertaking and has been fought with failure, it is an object of this invention to render many waste materials, solids or liquids, immobile or isolated from the environment such that benign disposal is possible.

SUMMARY OF THE INVENTION

The present invention is a process for permanently disposing of contaminated solids for which regulations require isolation and the prevention of any mobility of the waste once placed in the disposal site. The contamination can vary from water soluble or insoluble metals or inorganic salts, organic wastes all the way from crude oil to refined PCBs (polychlorinatedbiphenyls) and everything in between, tailings from mining operations, radioactive waste, both naturally occurring and manmade, and just plain contaminated soil. The process in its broadest sense involves the mixing of the contaminated solid in a bath of molten paraffin hydrocarbons, normally paraffin waxes having from about 20 to about 35 carbon atoms. This range of paraffinic hydrocarbons normally melt at about 145° F. and boil at about 490° to 540° F. and are normally purchased as paraffin waxes. The preferred temperature of the molten paraffin bath would be above the boiling point of water in order to drive out water from the interstices of the solids being treated. Preferably in the practice of the invention, the operation would include a means for collecting the water were it could be condensed and used for other purposes.

The contaminated solid would remain in contact with the bath for a time sufficient to reach thermodynamic equilibrium with the molten paraffin. Preferably the bath would be agitated to assure mixing and prevent clotting of the solid and also to form somewhat of a slurry in the presence of the molten paraffin having from about 10 wt. % to about 40 wt. % of the contaminated solids. Another continuous mode for practicing this invention would be to drive the contaminated solid through a longitudinal sump in a vessel having molten paraffin passing through it in a countercurrent flow. Once thermodynamic equilibrium between the contaminated solids and the surrounding molten paraffin is reached, the paraffin coated solids are separated from the paraffin and allowed to cool. Of course, the paraffin removed with the solids must be replaced in the bath. Surprisingly, the cooled solid is now water-free and coated, even within the pores and interstices of the solid particles, with the paraffin from the bath and are relatively impervious to an invasion from any outside source, particularly water unless the temperature of the particle once in the disposal site, is allowed to rise and approach the melting point of the paraffin. Thus, the selection of the disposal site and knowledge of its ambient conditions is important in the selection of the paraffin wax mixture. Normally, a commercially available mixture of paraffinic hydrocarbons resulting from the petroleum refining process, normally in the form of crystalline paraffin waxes, will be chosen for the bath. To accomplish the ultimate storage, the coated contaminated solid is formed by compression in a mold or rolled into a form prior to the final cooling while the paraffin is still soft and may be placed in a suitable container, preferably formed of additional paraffin for ultimate disposal either in a landfill, subterranean cavern, or other selected site.

In the preferred embodiment of this invention, where the waste is known to have, or may have, other volatile contaminants which will be expelled and possibly collected as aqueous or gaseous waste from the vessel, a zeolite material having an absorptive affinity for the contaminant would be introduced into the molten paraffinic hydrocarbon bath along with the contaminated solids waste such that when intimately mixed with the solids and the molten paraffin, escaping materials, particularly materials such as crude oil, aromatic hydrocarbons or aliphatic hydrocarbon product, would be absorbed into the pores or crystalline structure of the zeolite and captured within the molten bath and later fixed for disposal with the solid waste. When a zeolite or some other solid has been used to remove contamination from water associated with the solid, it can be placed in the molten bath for coating and disposal.

In the above described method, the objects of this invention are achieved. Contaminated waste requiring extraordinary disposal procedures is rendered isolated from the environment even when not placed in a disposal facility. It is placed in a condition such that even if exposed to other natural environmental occurrences, the contaminant will not become mobile and invade subterranean aquifers or municipal water supplies. It is now isolated by encapsulation and impervious to other influences, other than subsequent excavation and exposure to sufficient heat to melt the paraffin coating. Any mobility of the contaminating material is thereby prevented.

DETAILED DESCRIPTION OF THE INVENTION

For those multitude of instances where waste has contaminated the crust or soil of the earth to create a solid, contaminated with a material which forces the population to place it in a condition which not only isolates the waste from the non-contaminated part of the earth but prevents its mobility from a disposal site to invade other sensitive areas such as water supplies and subterranean aquifers through leaching and other motion, the present invention is a particularly useful method. These wastes would be generically categorized as soils, but by way of illustration, they could also be gangues, chemical process plant waste slurries, ore treatment tailings laced with arsenic from mining operations, radioactive tailings from uranium mining, radioactive solids created as wastes from weapons manufacture, inorganic wastes, including soluble or insoluble metal salts, organic wastes including, for example, crude oil, aromatic hydrocarbon products, aliphatic hydrocarbons, chlorinated hydrocarbons, chemical plant waste pit contamination from materials processing operations, or from the drilling of oil and gas wells. In short, the characteristic of waste which may be usefully treated by the process of this invention are those wastes where contaminants have invaded solid particles and have become either inseparable, or only separable with great difficulty, requiring that the solid particle itself be incarcerated along with the contaminating waste. The presence of water often complicates the treatment of contaminated solids, even when it contains at least 1 wt. % water.

When treating the contaminated solid in the process of this invention, it is often necessary to attend to the solid at the site where it is found, whether it be around a remote oil well, a uranium mine, or a chemical plant. One advantage of this invention is that the equipment chosen by one skilled in the art, (much equipment in many combinations are suitable), is capable of modular construction and transportation to even remote locations where the contaminated solid is excavated and normally sized on something like a grissley to remove extraordinarily large particles. For the practice of this invention the sizing would occur to create a uniformity in the particles to be treated in the process of this invention requiring a tradeoff between the particle size and resultant ease of handling which will become apparent in the later discussion and the difficulty of separating very fine particles from the bath in which the contaminated solids are to be treated. In the practice of this invention, a good average particle size to separate the solids phase material is to treat that which passes about a 10 mesh screen, grinding the more coarse particles until they also pass the screen. Those skilled in the art will make an adjustment to useful particle size based upon the type of material which must be treated and the treatment experience.

In dealing with contaminated solids on site, it is almost an invariable occurrence that considerable water is present often even to the extent that the contaminated solid is in the form of a slurry or a silt at the bottom of aqueous pond, all of which becomes a contaminated mess. The presence of water, of all substances, is one of the most troublesome materials. When dealing with solids contaminated water itself is a disposal problem which exacerbates the problem of treating and disposing of a contaminated solid. Accordingly, when large amounts of water are present, it is best to physically separate the contaminated solid from excess water in some of the many ways known to those skilled in the art such as, for example, high speed decanters or by screening on a series of shaker screens such that the contaminated solid introduced into the process of the present invention is separated from as much water as possible. While water can be removed from the solids in the molten paraffin bath in the practice of the present invention, it creates a significant inefficiency in the operation to remove a considerable amount of water because of energy consumption. In the practice of the process itself such water that is present would be collected from the apparatus used to treat the contaminated solids and condensed or otherwise captured for future use. There are numerous methods known to those in the art for purifying water. However, in the practice of this invention, it must be recognized that little is accomplished if a solid waste merely convened into a liquid or gaseous waste. The other waste removal techniques may be used to separate waste from water in conjunction with this method, in the scope of our invention. A zeolite could be used to clean the impurities from the waters and then, as described later, used in the molten bath to be coated and face disposal with the solids.

The contaminated solid, once separated from only large amounts of water present is then contacted with a bath of molten paraffinic hydrocarbons which are normally solid at room temperature. Paraffinic hydrocarbons are a normal commercial product, i.e. paraffin wax, from petroleum refining operations and are normally a mixture of hydrocarbons, in this case having about 20 to about 35 carbon atoms. These materials do not need to be pure compounds and, actually in the practice of this invention, to recognize cost constraints the materials may be even less pure than usual since they are going to be used as an environmentally safe disposal vehicle. In the practice of this invention, the paraffinic hydrocarbons used would be selected which have a melting point of about 145° F. and a boiling point of about 500° F. The boiling point and melting point of the paraffin wax would be selected based upon the particular characteristics of the contaminant. It is important to select the wax that does not boil at bath conditions but still will capture the waste. The paraffinic hydrocarbon mixture is melted, to provide a bath. For treatment the bath is maintained at a temperature greater than the boiling point of and at a temperature at which volatile contaminants are expelled into the liquid. In a closed vessel under pressure, the temperatures would be higher to account for the pressure effect on boiling. A preferred temperature for the bath is from about 275° F to about 400° F., especially preferred is up to about 300° F.

A bath is created which would, once in the steps of contacting the contaminated solids, form a readily separable solids/liquids mixture of the molten paraffinic hydrocarbon liquid phase and a solids phase of the contaminated solid such that the mixture, or slurry, would have a solids content from about 10% to about 40% by weight, preferably from about 15 % to about 30%. Preferably, in the practice of the invention, some known means of movement or agitation will be used, to assure contact of the solids with the molten paraffinic hydrocarbon bath.

The contaminated solids remain in the bath for a time sufficient to reach a thermodynamic equilibrium with the molten bath and obtain the temperature of the surrounding molten paraffinic hydrocarbon. It is well understood that a vessel in which this process is practiced must contain a heating source, either inside heating coils or a surrounding jacket in order that the heat used in the process of expelling the waste from the solid and evaporating any water present is replaced to reach this thermodynamic equilibrium. Those skilled in the art would clearly recognize the many ways possible for accomplishing this.

In the preferred embodiment of this invention, where the waste is known to have or may have other contaminants which will be expelled and possibly collected as aqueous or gaseous waste from the vessel, a zeolite material would be introduced into the molten paraffinic hydrocarbon bath along with the contaminated solids waste such that, when the zeolite is intimately mixed with the solids and the molten paraffin, escaping containment materials, particularly materials such as crude oil, aromatic hydrocarbons or aliphatic hydrocarbon product, would be absorbed into the pores or crystalline structure of the zeolite and captured within the molten bath and later fixed for disposal with the solid waste. A convenient way to determine the amount of zeolites needed in the practice of this invention will be to analyze a representative sample of the contaminated solid to determine the amount of contaminants which are likely to be expelled during the contact with the bath. Then charge an amount of the chosen zeolite to the bath in excess of the amount of contaminant present, up to at least about twice that amount of contaminant present in the solids before treatment. The amount should be from about 2 to about 4 times the amount of the contaminant, and mix it into the bath with the contaminated solids. The maximum amount of zeolite chosen is an economic, rather than technical, limitation. It can be either premixed with the solids, which is preferred, or allowed to mix within the treating bath, where it is mixed intimately with the molten paraffin and contaminated solid.

The selection of the zeolite can be made by those skilled in the art with a few tests since there are well over 100 known naturally occurring zeolite species and many species which are synthetically made. One species of naturally occurring zeolite particularly useful is the mordenite species. Again, because of the nature of the practice of this invention and the result desired, impure or even contaminated zeolite itself could be used in the practice of the process. A zeolite used to clean water decanted from the solids may be used as a means to dispose of these impurities. For instance, many synthetic zeolites are used as catalysts for the cracking of petroleum hydrocarbons. At times there is a waste of these catalyst for disposal. Even zeolites requiring special disposal techniques themselves may be useful in the practice of this invention thereby making the process of this invention even more of a useful tool for the disposal of waste.

With respect to the equipment useful in this step of the process, if a batch process is used, almost any closed stirred vessel, such as a stirred autoclave, may be used. Once the thermal equilibrium is determined, usually by a rise in temperature since heat is constantly being added to the system, or by stabilization of temperature where the addition of heat is constantly monitored, the mixing is stopped and the closed vessel containing a separable solids/liquids mixture dumped to separate the solids phase from the liquids phase of the mixture remembering, of course, that the temperature must be maintained above the paraffin melting point in order to prevent the solidification of the molten paraffin. Otherwise, the entire system could be filled with solid paraffin and require remelting.

If a continuous system is desired, the solids, substantially uniform in size, preferably sized to pass a 10 mesh screen, could be dumped into a sump in the bottom of a vessel having a longitudinal axis with the sump running along such axis with a conveyor, such as a screw conveyor, in the sump.

The solids, and zeolite if used, would be introduced into the sump beneath the surface of the molten paraffin being circulated in the system and moved through the sump from one end to the exit end where it is separated from the paraffin bath either by a screen allowing the paraffin to exit the sump for recycling or by a rising conveyor which lifts the solids now coated with paraffin, albeit liquid paraffin, from the molten paraffin bath. The rate of movement would be such that the residence time is sufficient to allow the thermodynamic equilibrium to be obtained, a matter easily determined by the skilled engineer.

The solids/liquids mixture is conveyed to a separating mechanism such as a heated shaker screen or centrifuge or preferably both, where the maximum amount of molten paraffin is separated for recycle to the bath. While the centrifuge is the preferred equipment for use at this separation step, those skilled in the art dealing with particular known solids could make a selection of any of other recognized separation equipment such as screening or hydroclone settling. The preferred centrifuge is made by Alpha-Laval of Warminster, Pa.

The molten paraffin recovered is returned to the bath for further use either after being combined with the recycle stream from the sump or directly to the bath. Of course, it will be necessary to include a makeup stream of additional molten paraffin to replace that which is coating the solids which have been removed for disposal. Also zeolite could be added at this point in the recycle stream to replace zeolites removed with the solids for disposal. When zeolites are used in the practice of this invention in order to maintain the solids content in the operating zone chosen by the operator, the addition of the zeolite would of necessity replace some of the solids being treated in order to maintain the ratio of zeolite to contaminants which are susceptible to being captured by the zeolite.

The waste is allowed to cool and the paraffin to solidify, thus trapping any contaminants in the solids or in the zeolite as the case may be. Prior to total cooling, it is a preferred practice of this invention to compress the coated solids into convenient shapes for handling, storing or disposal. For instance, it may be advantageous to optionally feed the separated solids directly from the centrifuge to an extruder of convenient size and capacity so that while cooling the coated solids may be compressed and extruded into long bars of various cross sectional shapes to be cut into convenient lengths and disposed of.

The disposal itself can take place, if in a properly prepared location, by either direct deposit into an approved landfill or specialty facility or by placing the coated solids and zeolites into a second secure container for ultimate transportation to a disposal site and disposal. It is a preferred practice of this invention to make that second container also a paraffin structure which is relatively inert to the environment when environment temperature does not approach the melting point of the paraffin. This is a fact those skilled in the art must consider when selecting the paraffin or paraffin mixture useful in the practice of this invention. This accomplishes ultimate encapsulation of the coated contaminated solid and, when employed, effectively isolates the prior contamination, whether it be hydrocarbon, metals or radioactivity from mobility to invade sensitive, uncontaminated areas of the earth's crust. Thus, the aforestated objectives of this invention are effectively accomplished.

Where a radioactive waste or a low level radioactive waste is treated in the practice of this invention, of course paraffin provides no shield for radioactivity, but it does isolate the radioactive waste and prevent its migration from a disposal site to other sensitive areas. Where carcinogens are involved such as PCBs or other aromatic hydrocarbons such as benzene, toluene or anthracene, or chlorinated hydrocarbons are treated, the zeolites help to prevent the escape of these materials to any water being evolved or the atmosphere and thus, effectively, similarly isolates them from further contamination in the earth. At present, the above-mentioned contamination problems are two of the most troublesome and prevalent, with the exception of the pervading presence of arsenic contamination in many locations.

Disposal of the thus isolated and immobilized wastes can occur in permitted land fills, subterranean caverns, or any other selected site, particularly due to the benign nature of the solid paraffin which, when less than pure paraffins are used, may require a second container of paraffin to effectively isolate it from the possibility of mobility due to leaching, abrasion, or other treatment. The outside container could be any suitable approved container which makes the waste disposable. If no outer container is needed, the paraffin outer material could be reinforced against leakage by imbedding a fabric, such as for example a nylon mesh, to reinforce the paraffin against damage through breakage or abrasion.

From the description of the foregoing invention, those skilled in the art needing to rid the environment of a contaminated solid and immobilize such contaminated material, would after reading the foregoing description, note the many changes and modifications which can be made to the above-described method, even to the point of adding or leaving out steps of this invention without departing from the scope of the invention and the appended claims. Any such changes in modifications are intended to be within the scope of the claims which follow.

I claim:

1. A process for treating a contaminated solid unacceptable for disposal in the environment to isolate the contaminant and render the solid immobile and environmentally benign, comprising the steps of:
   (i) contacting said contaminated solid in a bath of molten paraffinic hydrocarbon, normally solid at room temperature, for a time sufficient to coat such solid with paraffin to produce a solids/liquids mixture comprising a liquids phase and a solids phase, whereby any volatile contaminants in said contaminated solid are expelled into the liquid phase of said solids/liquids mixture and the solids phase and the liquids phase of said solids/liquids mixture are readily separable.

2. The process of claim 1, wherein said contaminated solid is a soil.

3. The process of a claim 1, wherein said contaminated solid contains at least 1 wt. % water.

4. The process of claim 1, wherein said process comprises physically removing physically separable water from said solids mixture prior to said contacting in step (i).

5. The process of claim 1, wherein said contaminant comprises an organic contaminant or a mixture of organic contaminants.

6. The process of claim 5, wherein said organic contaminant or mixture of organic contaminants comprises a crude oil, an aromatic hydrocarbon, an aliphatic hydrocarbon or a mixture thereof.

7. The process of claim 6, wherein said aromatic hydrocarbon is at least one of PCB, benzene, toluene and anthracene.

8. The process of claim 1, wherein said contaminated solid is radioactive.

9. The process of claim 1, wherein said paraffin is an aliphatic hydrocarbon having from about 20 to about 35 carbon atoms or mixtures thereof.

10. The process of claim 1, wherein the contacting in step (i) comprises a countercurrent contacting of said solid with said molten paraffin in the presence of a zeolite with an affinity for the absorption of a hydrocarbon.

11. The process of claim 1, wherein said contaminant is a metal salt.

12. A process for removing a volatile contaminant boiling at up to about 300° F. from a solid, said process comprising the steps of:
  (i) contacting said contaminated solid, at a temperature greater than the boiling point of the contaminant, in a bath of molten paraffinic hydrocarbon, normally solid at room temperature, for a time sufficient to coat such solid with paraffin to produce a solids/liquids mixture comprising a liquids phase and a solids phase, whereby any such volatile contaminant in said solid is expelled into the liquids phase of said solids/liquids mixture and the solids phase and the liquids phase of said solids/liquids mixture are readily separable; and
  (ii) separating the liquids phase comprising molten paraffin from the solids phase comprising solids coated with paraffins.

13. The process of claim 12, wherein said contaminated solid is soil.

14. The process of claim 12, wherein said contaminated solid contains at least 1 wt. % water.

15. The process of claim 14, wherein the water is removed from the mixture and recovered.

16. The process of claim 12, wherein said process comprises physically removing physically separable water from said contaminated solid prior to said contacting in step (i).

17. The process of claim 12, wherein said contaminant comprises an organic contaminant or mixture of organic contaminants.

18. The process of claim 17, wherein said organic contaminant or mixture of organic contaminants are crude oil, an aromatic hydrocarbon, an aliphatic hydrocarbon or a mixture thereof.

19. The process of claim 18, wherein said aromatic hydrocarbon is at least one of PCB, benzene, toluene and anthracene.

20. The process of claim 12, wherein said molten paraffin bath comprises a mixture of aliphatic hydrocarbons having from about 20 to about 35 carbon atoms having a boiling point greater than 300 ° F.

21. The process of claim 12, wherein contacting in step (i) includes agitating said solids/liquids mixture.

22. The process of claim 12, wherein the contacting in step (i) comprises a countercurrent contacting of said solid with said molten paraffin in the presence of hydrocarbon absorbing zeolite.

23. The process of claim 12, wherein the separating in step (ii) is by physically separating said liquids phase from said solids phase.

24. The process of claim 23, wherein the separating in step (ii) is by gravity, centrifuging, hydroclone settling or a combination thereof.

25. A process for isolating and rendering immobile and environmentally benign, contaminated solids comprising the steps of:
  (i) contacting said solids in a bath of molten paraffinic hydrocarbon, normally solid at room temperature, for a time sufficient to coat such solid with paraffin to produce a solids/liquids mixture comprising a liquids phase of molten paraffin and a solids phase, whereby a significant portion of any contaminant expelled from said solid in said solids/liquids mixture is extracted into the liquids phase of said solids/liquids mixture, and the solids phase and the liquids phase of said solids/liquids mixture are readily separable;
  (ii) separating the liquids phase from the solids phase of said solids/liquids mixture;
  (iii) cooling the separated solids phase to produce solids particles coated with solid paraffin; and
  (iv) recycling said liquids phase obtained to said contacting step (i) as at last part of said molten paraffin bath of said contacting step (i).

26. The process of claim 25, wherein said solid is a radioactive waste.

27. The process of claim 25, wherein a zeolite having an affinity for the contaminant is present in the bath in a sufficient excess over the amount of contaminant present in the solids mixture before treatment to absorb expelled contaminant.

28. The process of claim 27, wherein said contaminant comprises an organic contaminant or a mixture of organic contaminants.

29. The process of claim 28, wherein said organic contaminant or mixture of organic contaminants comprises a crude oil, an aromatic hydrocarbon, an aliphatic hydrocarbon or a mixture thereof.

30. The process of claim 29, wherein said aromatic hydrocarbon is at least one of PCB, benzene, toluene and anthracene.

31. The press of claim 25, wherein said molten paraffin bath comprises a mixture of aliphatic hydrocarbons having from about 20 to 35 carbon atoms.

32. The process of claim 31, wherein said bath is maintained at a temperature between the boiling point of water and about 300° F. and the boiling point of the paraffin mixture is from about 490° F. to about 540° F.

33. The process of claim 25, wherein said contacting in step (i) includes agitating said liquids/solids-mixture.

34. The process of claim 25, wherein the contacting in step (i) comprises a countercurrent contacting of said solid with said molten paraffin in the presence of hydrocarbon absorbing zeolite.

35. The process of claim 25, wherein the separating in step (ii) is by physically separating said liquids phase from said solids phase.

36. The process of claim 35, wherein the separating in step (ii) is by screening, centrifuging, hydroclone settling or in a combination thereof of said liquid phase from said solids phase.

37. The process of claim 25, wherein said recycling of said liquids phase is with the addition of molten paraffin to replace that coating the solids.

38. A process for removing a volatile contaminant boiling at up to about 300° F. from a solid comprising the steps of:
  (i) contacting said solids and an effective amount of a zeolite having an affinity for the contaminant in a bath of molten paraffinic hydrocarbons, normally solid at room temperature, for a time sufficient to coat such solids and expel the volatile contaminant into the molten paraffin to produce a solids/liquids mixture comprising a liquids phase of molten paraffin and a solids phase, whereby a volatile contaminant in said solids mixture is expelled into the liquids phase of said solids/liquids mixture to contact the zeolites present and be absorbed by the zeolites, wherein the solids phase and the liquids phase of said solids/liquids mixture are readily separable;

(ii) separating the liquids phase comprising molten paraffin from the solids phase comprising solids and zeolites containing the contaminants coated with paraffin;

(iii) cooling the separated solids phase to produce solids and zeolites coated in solid paraffin;

(iv) recycling said liquids phase to said contacting step (i) as at least part of said molten paraffin bath of said contact step (i); and (v) enclosing the encapsulated solids in a cavity of solid paraffin container for isolated disposal.

39. The process of claim 38, wherein said solid is a soil.

40. The process of claim 38, wherein said solid is a low level radioactive waste.

41. The process of claim 38, wherein said contaminant comprises an organic contaminant or a mixture of organic contaminants.

42. The process of claim 41, wherein said organic contaminant or mixture of organic contaminants comprises crude oil, an aromatic hydrocarbon, an aliphatic hydrocarbon or a mixture thereof.

43. The process of claim 38, wherein said molten paraffin bath comprises a mixture of aliphatic hydrocarbons having from about 20 to about 35 carbon atoms.

44. The process of claim 38, wherein said contacting step (i) includes agitating said solids-mixture.

45. The process of claim 38, wherein the contacting in step (i) comprises a countercurrent contacting of said solid with said molten paraffin in the presence of hydrocarbon absorbing zeolite.

46. The process of claim 38, wherein the separating in step (ii) is by physically separating said liquids phase from said solids phase.

47. The process of claim 46, wherein the separating in step (ii) is by screening, centrifuging, hydroclone settling or a combination thereof of said liquids phase from said solids phase.

48. The process of claim 38, wherein said recycling of said liquids phase is with the addition of additional molten paraffin to replace that depleted.

* * * * *